Sept. 25, 1934.   H. KUHNEN   1,974,746

REMOVABLE WHEEL FOR MOTOR AND OTHER VEHICLES

Filed June 28, 1933

INVENTOR
HERMANN KUHNEN
BY
ATTORNEYS

Patented Sept. 25, 1934

1,974,746

UNITED STATES PATENT OFFICE 1,974,746

REMOVABLE WHEEL FOR MOTOR AND OTHER VEHICLES

Hermann Kuhnen, Berlin, Germany

Application June 28, 1933, Serial No. 678,005
In Germany June 29, 1932

1 Claim. (Cl. 301—9)

This invention relates to removable wheels, and more especially to that type adapted to be mounted on flanges provided on the axle hub of a motor vehicle.

In wheels of this type the nut of each fixing bolt is generally provided with a ball or cone which is adapted to engage in a recess or opening provided in the wheel disc; in some instances such a spherical or conical or tapered surface is also provided on the bolt itself which is adapted to engage in a recess in the wheel disc, the said recess forming a female counterpart into which the male part fits. But in all cases a very strong bursting action is exerted on the material of the wheel disc, when the nuts are fully tightened up, which may result in the destruction of the material.

According to the present invention this serious defect is eliminated by the fact that a concavo-convex or like shaped part is formed on the wheel body at each fixing point and adapted to be clamped between a male and a female spherical surface, one of the said surfaces being provided on the fixing bolt and the other on the nut therefor.

In order that the said invention may be clearly understood and readily carried into effect, the same will now be described more fully, by way of example, with reference to the accompanying drawing, in which:—

Figure 1:
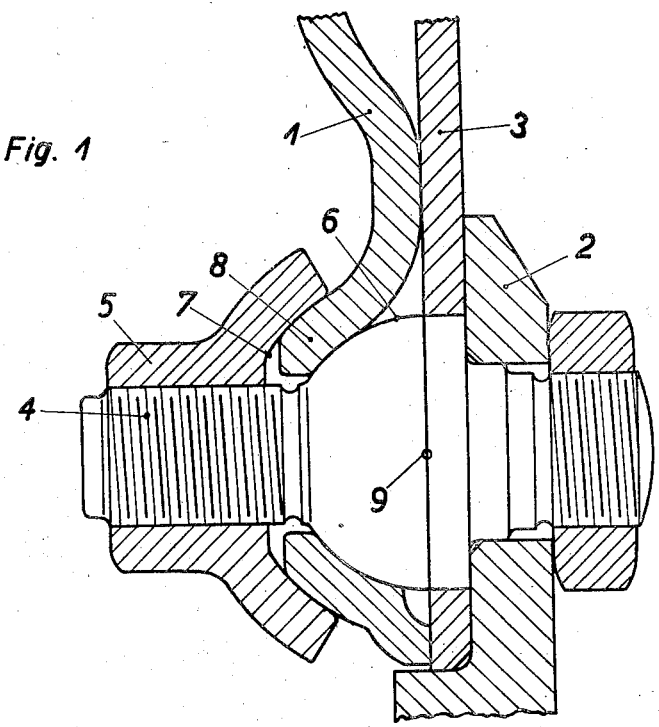
Figure 2:
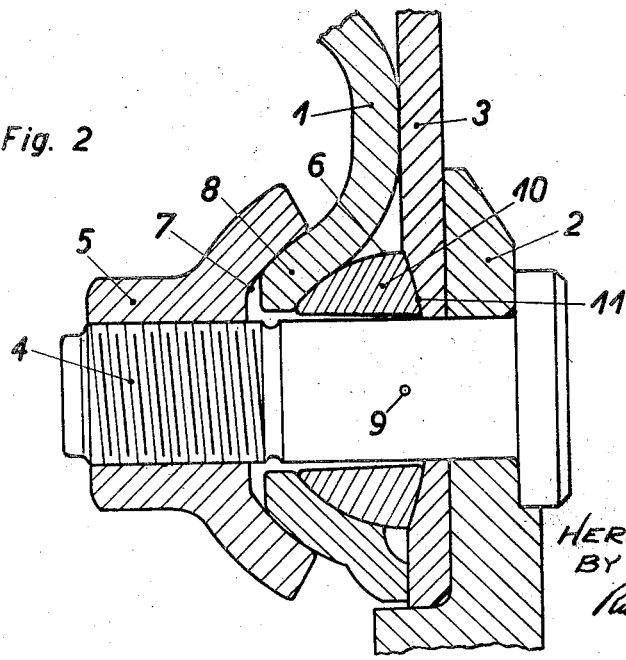

Figure 1 is a fragmentary transverse sectional view of a wheel embodying the invention, and Figure 2 is a similar view to Figure 1 but showing a modification.

Referring first more particularly to Figure 1 of the drawing, the wheel disc 1 is connected to a collar 2 of an axle hub, and to a brake drum 3, by means of bolt members 4 and nuts 5. A male spherical seating surface 6 is provided on each bolt 4 and a corresponding female spherical surface 7 is provided on each nut 5. The wheel disc 1 is provided with concavo-convex or like portions 8 which correspond with, and are adapted to be clamped between the spherical surfaces 6 and 7 whereby the disc 1 is held securely in place. When the various parts are screwed up tight, the spherical surfaces of the nuts, the portion 8 and the bolt have one common centre 9.

As each nut 5 is screwed home, the respective portion 8 is adapted to fit between the spherical surfaces 6 and 7 in such a manner that a perfect and complete fit of the portion 8 against the bolt 4 and the nut 5 is obtained, even if the longitudinal axis or centre line of the bolt is not in perfect alignment with the centre of the portion 8, a fact which generally occurs, especially as the wheel discs are in most cases manufactured in other works than those producing the axle hubs.

In fixing wheels by means of the usual hemispherical or ball or tapered surfaces engaging within recesses or openings on the wheel discs, any inexactitudes in the register of the axes of the bolts and the centre of the openings or recesses are the cause of the spherical or conical surfaces of the nuts fitting tightly only on one side of the wheel discs, a fact which is the cause of further stresses on the material of the wheel disc at these particular points.

This defect also is completely eliminated by the present invention, as it ensures a uniform fit all around the surface.

The female surface 7, instead of being on the nut, may be provided on the bolt and the male spherical surface 6 on the nut, this, of course, requiring a correspondingly altered shape of the concavo-convex or like portion 8 of the wheel disc 1.

The present invention may also be adapted for use with coupling hubs of wire spoke wheels.

In the modified constructional form shown in Figure 2, the spherical surface 6 of the bolt 4 is formed on an individual and removable member 10. By this arrangement, it is possible to use, at will, wheels or to interchange wheels which are, according to the present invention, fixed to the flange of the hub, or such where the nut of the fixing bolt provided with a ball or conical surface engages in an opening or recess provided therefor in the wheel disc in the manner known per se. In the latter instance, however, a bolt provided with a ball or spherical surface could not be employed; it would therefore be necessary in the first instance to remove these bolts and to replace them by others having no ball surface. The exchange of the fixing bolts for the wheels is, however, in the case of an assembled car so difficult that it is of very little practical use. But if the spherical surface 6 of the bolt is, as shown in Figure 2, formed on a separate removable member 10, then it is only necessary to place this member on or remove the same from the bolt 4, according to whether wheels of one or the other type of mounting are to be used.

The removable member 10 provided with the spherical or ball surface 6 is, as shown, preferably provided with a spherical surface 11 adapted to engage a correspondingly shaped recess in the brake drum 3 or a suitable recess provided in the hub flange 2. By these means an absolutely secure fit and seating of the member 10 is ensured, as the play or tolerance allowed between the member 10 and the bolt 1 for the purpose of facilitating the removal of the member 10 is neutralized by reason of the fit of the spherical surfaces, and by reason that the radial stresses are fully and well absorbed. Moreover, the fitting in of the portion 8 and the corresponding spherical surface of the removable member 10 is greatly improved. The bore of the member 10 is preferably tapered, thus producing a larger zone for the fitting in of the spherical or ball surfaces.

I claim:

In combination, in a demountable vehicle wheel construction of the type including a hub having a flange provided with a series of spaced holes arranged in a circle and bolts in said holes, a demountable wheel having a flange provided with a series of circumferentially spaced holes which approximately register with said first-mentioned holes, said last-mentioned holes also receiving said bolts, and nuts on the axially outer ends of said bolts, said construction including hollow spherical portions formed in said wheel flange protruding axially outwardly and each centered on the axis of a hole, a spherically shaped shoulder on each bolt of the same contour as the axially inner side of a hollow spherical portion and received by said spherical portion, and a spherical recess on the axially inner side of each nut of the same contour as the outer side of a hollow spherical portion, the surfaces of the spherical portions of the nuts, respective hollow spherical wheel portions and spherically shaped shoulders all having their spherical surfaces centered at common points in substantially the plane of the rear of said wheel flange when their axes are aligned and said hollow spherical portions are clamped between the nuts and the spherically shaped shoulders.

HERMANN KUHNEN.